US008482619B2

(12) United States Patent
Doida

(10) Patent No.: US 8,482,619 B2
(45) Date of Patent: Jul. 9, 2013

(54) IMAGE PROCESSING METHOD, IMAGE PROCESSING PROGRAM, IMAGE PROCESSING DEVICE, AND IMAGING DEVICE FOR IMAGE STABILIZATION

(75) Inventor: Shigeru Doida, Machida (JP)

(73) Assignee: Nikon Corporation, Tokyo (JP)

( * ) Notice: Subject to any disclaimer, the term of this patent is extended or adjusted under 35 U.S.C. 154(b) by 1167 days.

(21) Appl. No.: 12/084,642

(22) PCT Filed: Nov. 29, 2006

(86) PCT No.: PCT/JP2006/323825
§ 371 (c)(1),
(2), (4) Date: May 7, 2008

(87) PCT Pub. No.: WO2007/074605
PCT Pub. Date: Jul. 5, 2007

(65) Prior Publication Data
US 2010/0027661 A1 Feb. 4, 2010

(30) Foreign Application Priority Data
Dec. 26, 2005 (JP) ................................. 2005-372182

(51) Int. Cl.
*H04N 5/228* (2006.01)
(52) U.S. Cl.
USPC ................... 348/208.4; 348/168; 348/208.13; 348/208.14; 348/222.1
(58) Field of Classification Search
USPC .................... 348/168, 208.14, 208.4, 208.13, 348/222.1
See application file for complete search history.

(56) References Cited

U.S. PATENT DOCUMENTS

| 5,237,405 | A | 8/1993 | Egusa et al. | |
|---|---|---|---|---|
| 5,563,652 | A | 10/1996 | Toba et al. | |
| 5,648,815 | A | 7/1997 | Toba | |
| 6,804,419 | B1 | 10/2004 | Miyake | |
| 2001/0008545 | A1* | 7/2001 | Takeda et al. | 375/240.16 |
| 2002/0159527 | A1* | 10/2002 | Pelagotti et al. | 375/240.16 |
| 2003/0156641 | A1* | 8/2003 | Sohn | 375/240.02 |

FOREIGN PATENT DOCUMENTS

| JP | A 4-180370 | 6/1992 |
|---|---|---|
| JP | A 7-38800 | 2/1995 |
| JP | A 7-123406 | 5/1995 |

(Continued)

OTHER PUBLICATIONS

Feb. 17, 2010 Search Report and Search Opinion issued in European Patent Application No. 06833629.6.

(Continued)

*Primary Examiner* — Usman Khan
(74) *Attorney, Agent, or Firm* — Oliff & Berridge, PLC

(57) ABSTRACT

An image-processing method is an image-processing method for detecting motion between plural images, including a searching operation of searching for a local motion vector from each of blocks in the plural images on the basis of feature quantity of the plural images, and a calculating operation of calculating evaluation values of the local motion vector found, in which one of the evaluation values is accuracy of position adjustment which is obtained when the search source block of said local motion vector is position-adjusted on a trial basis by using the local motion vector in order to provide an image-processing method, an image-processing program, an image-processing apparatus, and an imaging apparatus which can properly evaluate local motion vectors which are found by searching blocks of images upon detecting motion of plural images.

12 Claims, 5 Drawing Sheets

FOREIGN PATENT DOCUMENTS

| | | |
|---|---|---|
| JP | A 7-231446 | 8/1995 |
| JP | A 9-73540 | 3/1997 |
| JP | A-09-093585 | 4/1997 |
| JP | A 10-134193 | 5/1998 |
| JP | A 2000-244851 | 9/2000 |
| JP | A-2003-224854 | 8/2003 |
| JP | A-2004-173012 | 6/2004 |
| JP | A 2005-301984 | 10/2005 |

OTHER PUBLICATIONS

Jun. 12, 2012 Office Action issued in Japanese Patent Application No. 2007-551871 (with translation).

\* cited by examiner

Fig.3
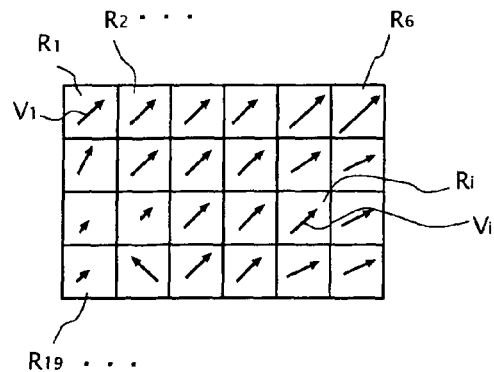
Fig.4
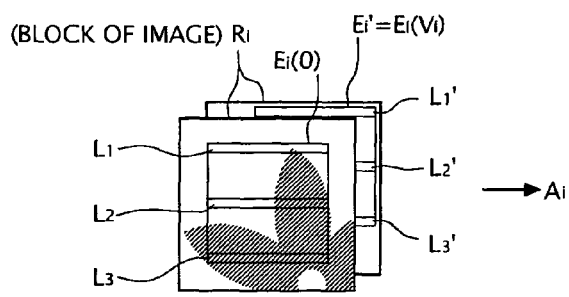
Fig.5
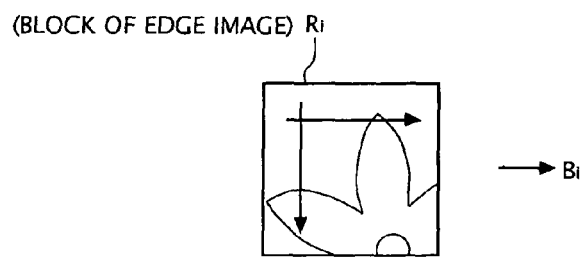
Fig.6
(BLOCK OF EDGE IMAGE) Ri
⟶ Bi

IMAGE PROCESSING METHOD, IMAGE PROCESSING PROGRAM, IMAGE PROCESSING DEVICE, AND IMAGING DEVICE FOR IMAGE STABILIZATION

This is a U.S. National Phase application claiming the benefit of prior filed International Application Number PCT/JP2006/323825, filed Nov. 29, 2006, in which the International Application claims a priority date of Dec. 26, 2005 based on prior filed Japanese Application Number 2005-372182, the entire contents of which are incorporated herein by reference.

TECHNICAL FIELD

The present invention relates to an image-processing method and an image-processing program which are applied to a digital camera, image-processing software, or the like. Further, the present invention relates to an image-processing apparatus which is applied to a digital camera and to an imaging apparatus such as a digital camera.

BACKGROUND ART

Image stabilization by digital processing detects a motion vector between plural images which are photographed continuously, and position-adjusts and composes the images according to the motion vector.

In one method for detecting a motion vector, individual blocks of plural images are searched for motion vectors (local motion vectors) and one motion vector of the entire image is determined on the basis of the local motion vectors (refer to Patent Documents 1 and 2, for example).

However, since local motion vectors include erroneously-detected ones, it is desirable to evaluate each local motion vector and correct (vector-correct) it if necessary.

Incidentally, also Patent Document 2 discloses a vector correction method in which each local motion vector is compared with neighboring ones and, if the former is extremely different from the latter, the values of the former are replaced by those of the latter.

Patent Document 1: Japanese Unexamined Patent Application Publication No. H7-38800
Patent Document 2: Japanese Unexamined Patent Application Publication No. H7-231446

DISCLOSURE

Problems to be Solved

However, the above vector correction method is merely such that minority local motion-vectors are made closer to majority local motion-vectors. Therefore, although this method can make the distribution of local motion vectors smooth, if correctly-detected local motion vectors are minority ones many local motion vectors are corrected in a wrong direction.

An object of the present invention is therefore to provide an image-processing method, an image-processing program, an image-processing apparatus, and an imaging apparatus which can evaluate local motion vectors properly.

Means for Solving the Problem

The invention provides an image-processing which detects motion between plural images, the method including a searching operation of searching for a local motion vector from each of blocks in the plural images on the basis of feature quantities of the images; and a calculating operation of calculating one or plural evaluated values of the local motion vector found, the image-processing method further including one of the evaluated values is accuracy of position adjustment which is obtained when the search source block of the local motion vector is position-adjusted on a trial basis by using detected the local motion vector.

The accuracy of position adjustment may be accuracy of position adjustment which is obtained when a portion of the search source block of the local motion vector is position-adjusted on a trial basis by using the local motion vector.

The image-processing method according to the invention may further include a correcting operation of correcting the local motion vector on the basis of the evaluated values.

The correcting operation may evaluate the local motion vector to be corrected and its neighboring local motion vectors relative to each other using their evaluated values, and correct values of the local motion vector to be corrected using values of a local motion vector that has received a high evaluation among the local motion vector to be corrected and its neighboring local motion vectors.

The image-processing method may be in which another of the evaluated values is an edge amount included in the search source block of the local motion vector, and that in the relative evaluation ones having small edge amount is removed from the local motion vector to be corrected and its neighboring local motion vectors and then remaining local motion vectors are ranked according to their accuracy of position adjustment.

The image-processing method may be in which if a search source block of the local motion vector as the subject of correction to be corrected is located at a corner of the images, the correcting operation corrects a horizontal component of the local motion vector to be corrected using a horizontal component of a local motion vector adjacent to the local motion vector to be corrected in a vertical direction to be corrected, and corrects a vertical component of said local motion vector to be corrected using a vertical component of a local motion vector adjacent to said local motion vector to be corrected in a horizontal direction, in spite of the evaluated values of the local motion vector to be corrected.

The calculating operation and the correcting operation for all of local motion vectors may be performed plural times repeatedly.

The image-processing method according to the invention may further include a composing operation of composing the plural images with position adjustment on the basis of corrected local motion vector.

An image-processing program according to the invention configured to cause a computer to execute the image-processing method according to any one of the above aspects of the invention.

An image-processing apparatus according to the invention includes a calculating unit which executes the image-processing method according to any one of the above aspects of the invention.

An imaging apparatus according to the invention includes an imaging unit capable of continuously imaging a subject to obtain plural images; and the image-processing apparatus according to the invention.

Effects

The invention provides an image-processing method, an image-processing program, an image-processing apparatus, and an imaging apparatus which can evaluate local motion vectors properly.

BRIEF DESCRIPTION OF THE DRAWINGS

FIG. 3 illustrates step S3.

FIG. 4 illustrates step S4.

FIG. 5 illustrates an evaluated value $A_i$.

FIG. 6 illustrates an evaluated value $B_i$.

DETAILED DESCRIPTION OF THE EMBODIMENTS

Hereinafter, an embodiment of the present invention will be explained. This embodiment is an embodiment of an electronic still camera having an image-stabilizing function.

Figure 1:
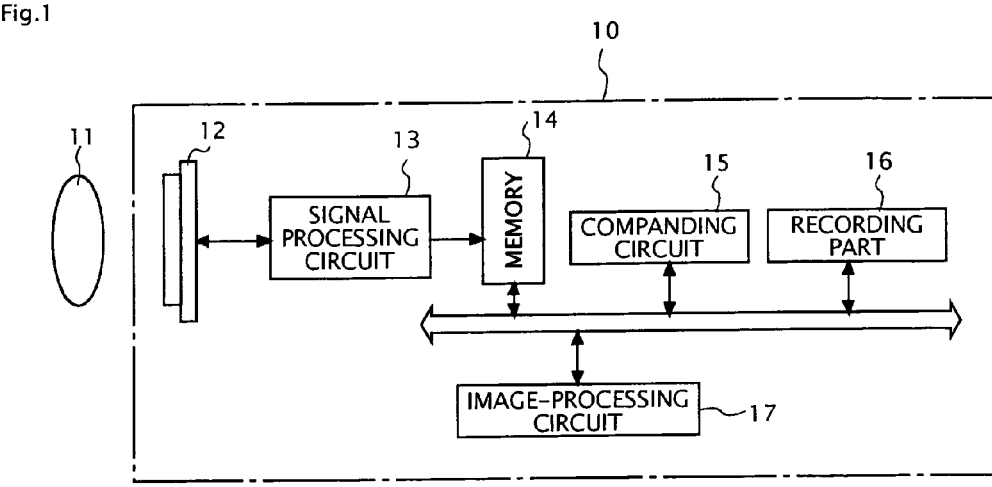
FIG. 1 is a block diagram showing a structure of an electronic still camera of an embodiment.

FIG. 1 is a block diagram showing the structure of an electronic still camera. As shown in FIG. 1, in the electronic still camera 10, there are arranged an imaging sensor 12, a signal-processing circuit 13, a memory 14, a companding circuit 15, a recording part 16, and an image-processing circuit 17.

A shooting lens 11 attached to the electronic still camera 10 forms an optical image of a subject on the imaging sensor 12. The imaging sensor 12 images the optical image of the subject to obtain an image. This image is processed in the signal-processing circuit 13 and thereafter stored temporarily in the memory 14. The image-processing circuit 17 performs an image-processing on the image, and the image after the image-processing is subjected to a compression processing in the companding circuit 15 and thereafter recorded in the recording part 16.

Particularly, when the electronic still camera 10 is set to an image stabilization mode, the imaging sensor 12 obtains 2×n number of images at infinitesimal-time intervals with under-exposure of n levels relative to an proper exposure time or an exposure time set in advance. The image-processing circuit 17 inputs the plural images and executes an image stabilization processing to obtain a stabilized image. The stabilized image is recorded in the recording part 16 via the companding circuit 15.

Next, the entire image stabilization process which is executed by the image-processing circuit 17 will be described.

Figure 2:
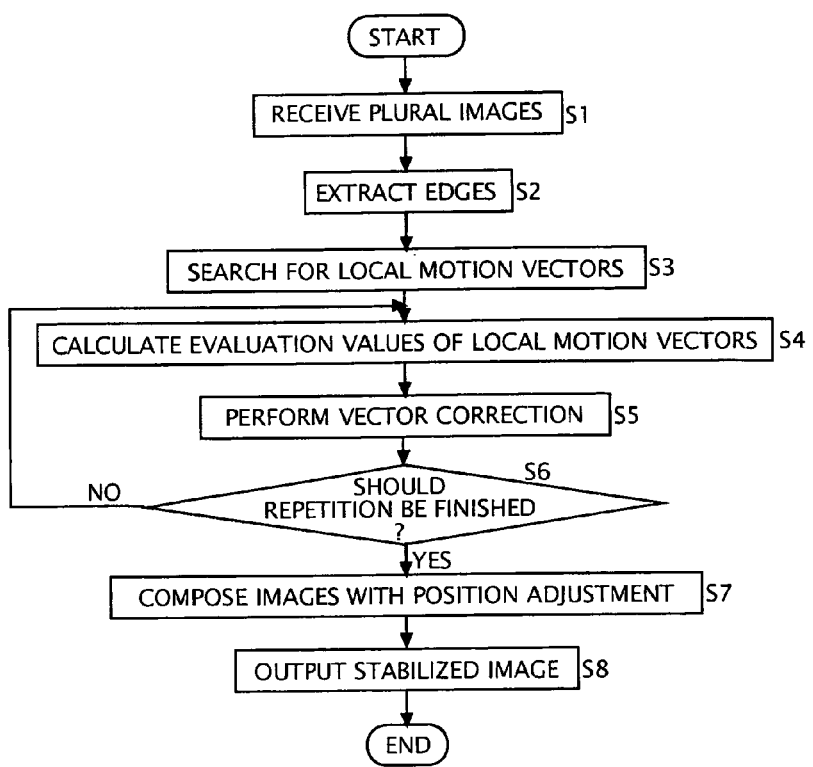
FIG. 2 is a flowchart showing a flow of an image stabilization process.

FIG. 2 is a flowchart of the image stabilization process. As shown in FIG. 2, when receiving plural images at step S1, at step S2 the image-processing circuit 17 performs edge extraction on each of the images. At step S3, the image-processing circuit 17 searches individual blocks of the plural images for local motion vectors on the basis of the acquired edge images.

At step S4, the image-processing circuit 17 calculates evaluated values of each local motion vector at step S4 and performs vector correction at step S5. Steps S3 and S4 are repeated a predetermined number of times (refer to step S6).

The invention is not limited to the case that the calculation of evaluated values (step S4) and the vector correction (step S5) are performed in series and they may be executed in parallel. As described later in detail, it is not always the case that all evaluated values are necessary in the vector correction. Therefore, while the vector correction is being performed, only evaluated values that are currently necessary may be calculated as appropriate.

At step S7, the image-processing circuit 17 composes the plural images with position adjustment on the basis of finally obtained local motion vectors. At step S8, the image-processing circuit 17 outputs a composed image as a stabilized image.

Next, steps S3, S4, S5, and S7 will be described in detail. For the sake of simplicity, it is assumed in this embodiment that the number of images is two.

(Step S3)

FIG. 3 illustrates step S3. At this step, as shown in FIG. 3, each of two edge images is divided into plural blocks $R_1$, $R_2$, .... In this embodiment, it is assumed that each edge image is divided into six parts in the vertical direction and four parts in the horizontal direction (into 24 blocks).

Then, each of the blocks $R_1, R_2, \ldots, R_{24}$ is searched for a local motion vector. In the following, a local motion vector of an ith block $R_i$ will be referred to as $V_i$ which is given the same suffix as the block $R_i$. Various known search techniques such as block matching can be applied to this search. However, local motion vectors $V_1, V_2, \ldots, V_{24}$ thus found would include ones which are low in search accuracy.

(Step S4)

FIG. 4 illustrates step S4. At this step, two evaluated values are calculated for each of the local motion vectors $V_1$, $V_2, \ldots, V_{24}$. The two evaluated values are referred to as A and B, and the evaluated values of an ith local motion vector $V_i$ are denoted by $A_i$ and $B_i$ which are given the same suffix as $V_i$.

FIG. 5 illustrates the evaluated value $A_i$.

The evaluated value $A_i$ is accuracy of position adjustment that is obtained when the search source block $R_i$ of the local motion vector $V_i$ is position-adjusted on a trial basis by using the local motion vector $V_i$.

This position adjustment is performed on the block $R_i$ of the image that has not been subjected to the edge extraction rather than that of the edge image. At this stage, it is only required that accuracy of position adjustment be calculated. Therefore, to reduce the amount of calculation, the trial position adjustment is performed only for portions of the block $R_i$ such as three representative lines $L_1$, $L_2$, and $L_3$ which are located at both ends and the center.

Therefore, for example, to calculate an evaluated value $A_i$, three representative lines $L_1$, $L_2$, and $L_3$ are extracted from the block $R_i$ of one of two images and three representative lines $L_1'$, $L_2'$, and $L_3'$ are extracted from the same block $R_i$ of the other of the two images. At this time, to perform trial position adjustment, coordinate deviations corresponding to the local motion vector $V_i$ are given between an extraction source area $E_i$ of the lines $L_1$, $L_2$, and $L_3$ and an extraction source area $E_i$ of the lines $L_1'$, $L_2'$, and $L_3'$. A correlation value (e.g., the sum of the absolute values of the differences between pixel values) between the lines $L_1$, $L_2$, and $L_3$ and the lines $L_1'$, $L_2'$, and $L_3'$ is calculated as accuracy of position adjustment and can be employed as an evaluated value $A_i$. The reliability of the local motion vector $V_i$ can be regarded as higher as the evaluated value $A_i$ decreases.

FIG. 6 illustrates the evaluated value $B_i$.

The evaluated value $B_i$ is an edge amount of the search source block $R_i$ of the local motion vector $V_i$. It is sufficient to use only one of the two edge images as a subject of edge amount extraction.

For example, where the edge image is made of two components, that is, a vertical edge component and a horizontal edge component, the sum of the absolute values of the two components is calculated and can be employed as an evaluated value $B_i$. The reliability of the local motion vector V can be regarded as higher as the evaluated value $B_i$ increases. Another calculation method can be used as long as it can produce an evaluated value indicating an edge amount of the block $R_i$.

(Step S5)

At this step, each of the local motion vectors $V_1, V_2, \ldots, V_{24}$ is vector-corrected on the basis of the evaluated values A and B.

Figure 7:
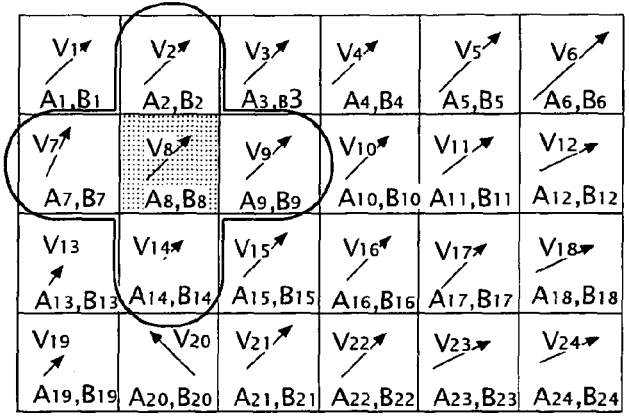
FIG. 7 illustrates a case that a subject of vector correction is located at a central position of an image.

However, when the local motion vector $V_8$ which is emphasized in FIG. 7 is vector-corrected, the neighboring local motion vectors $V_7, V_2, V_9,$ and $V_{14}$ which are enclosed by a thick line are made involved. Since the search source block of the local motion vector $V_8$ is in contact with none of the end lines of the image, the number of neighboring local motion vectors is four. This also applies to cases that the local motion vectors $V_9$-$V_{11}$ and $V_{14}$-$V_{17}$ are vector-corrected.

Figure 8:
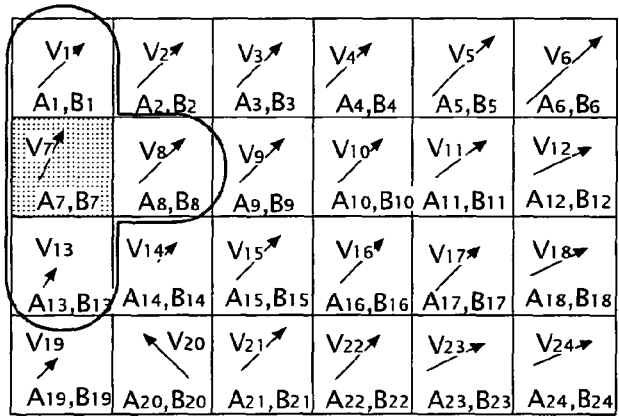
FIG. 8 illustrates a case that a subject of vector correction is located at an end position of an image.

On the other hand, when the local motion vector $V_7$ which is emphasized in FIG. 8 is vector-corrected, the neighboring local motion vectors $V_1, V_8,$ and $V_{13}$ which are enclosed by a thick line are made involved. Since the search source block of the local motion vector $V_7$ is in contact with one end line of the image, the number of neighboring local motion vectors is three. This also applies to cases that the local motion vectors $V_2$-$V_5, V_{12}, V_8, V_{13},$ and $V_{20}$-$V_{23}$ are vector-corrected.

Figure 9:
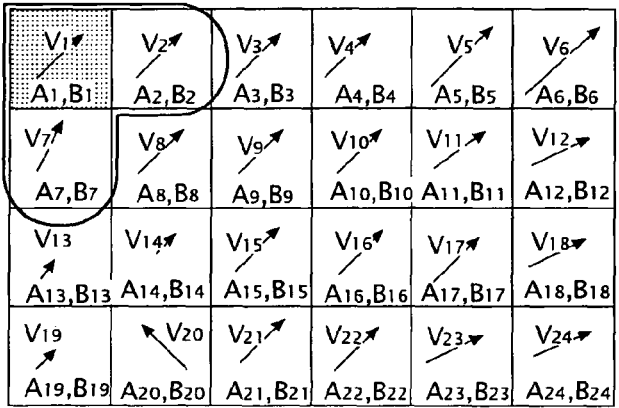
FIG. 9 illustrates a case that a subject of vector correction is located at one of the four corners of an image.

When the local motion vector $V_1$ which is emphasized in FIG. 9 is vector-corrected, the neighboring local motion vectors $V_2,$ and $V_7$ which are enclosed by a thick line are made involved. Since the search source block of the local motion vector $V_1$ is located at the corner of the image, the number of neighboring local motion vectors is two. This also applies to cases that the local motion vectors $V_6, V_{19},$ and $V_{24}$ are vector-corrected.

Figure 10:
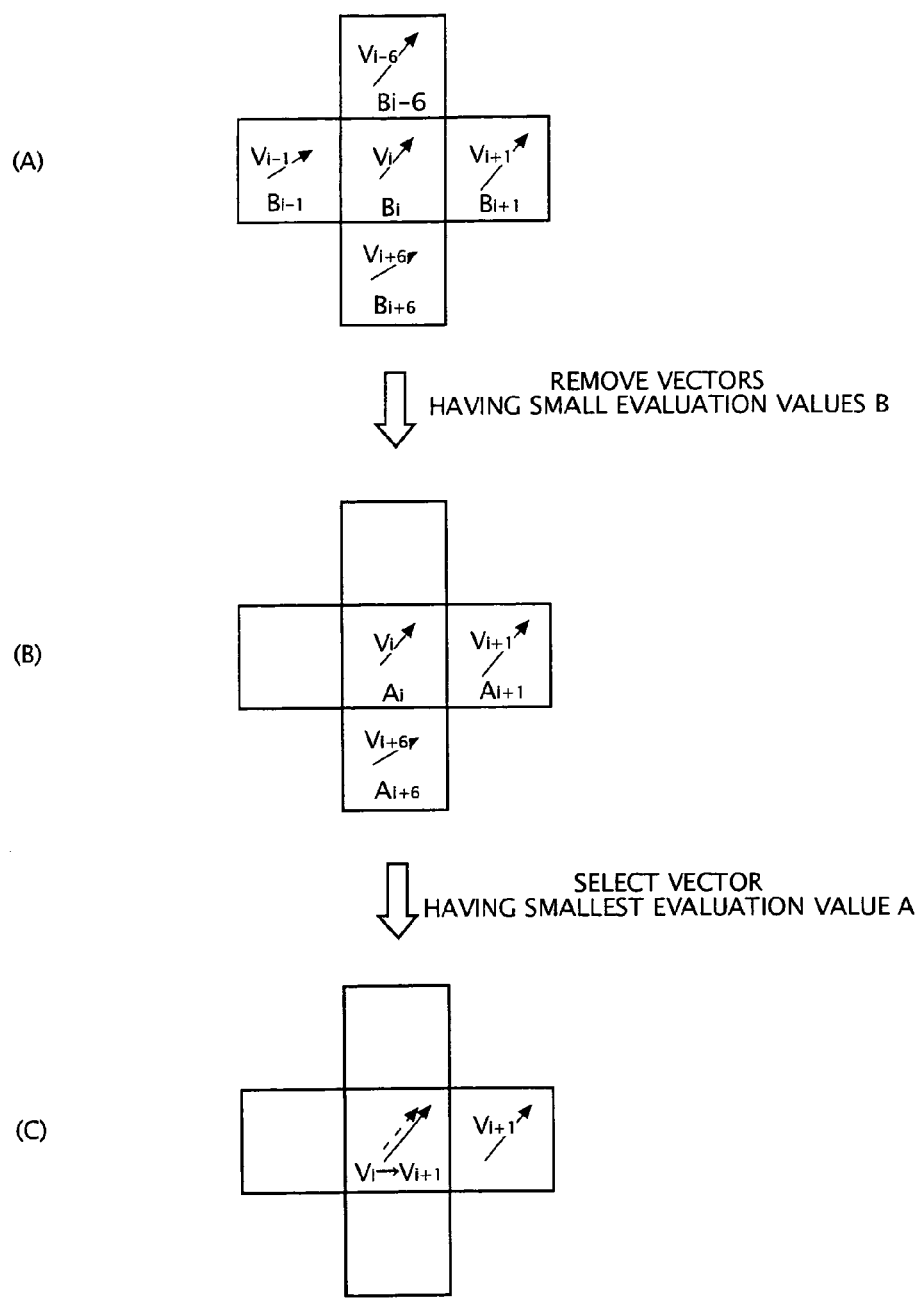
FIG. 10 illustrates a vector correction method in detail (a central position of an image).

Next, a vector correction method for a case that a subject of vector correction is located at a central position of the image (see FIG. 7) will be described in detail with reference to FIG. 10. A vector correction method for a case that a subject of vector correction is in contact with one end line of the image (see FIG. 8) will not be described because it is different from the method that is going to be described only in that the number of neighboring local motion vectors is smaller by one.

In this vector correction, first, as shown in FIG. 10(A), the evaluated values $B_i, B_{i+1}, B_{i-1}, B_{i+1}, B_{i-6},$ and $B_{i+6}$ of the five local motion vectors $V_i, V_{i+1}, V_{1-1}, V_{i+1}, V_{i-6},$ and $V_{i+6}$ including the subject of the vector correction are referred to and their average value BA is calculated. Each of the five evaluated values $B_i, B_{i+1}, B_{i-1}, B_{i+1}, B_{i-6},$ and $B_{i+6}$ is compared with the average value BA which serves as a threshold value. Local motion vectors corresponding to evaluated values that are larger than or equal to the threshold value are judged reliable, and local motion vectors corresponding to evaluated values that are smaller than the threshold value are judged unreliable and hence removed. It is assumed here that the three local motion vectors $V_i, V_{i+1},$ and $V_{i+6}$ have been judged reliable.

Then, as shown in FIG. 10(B), the evaluated values $A_i, A_{i+1},$ and $A_{i+6}$ of the local motion vectors $V_i, V_{i+1},$ and $V_{i+6}$ which have been judged reliable are referred to and compared with each other. A local motion vector whose evaluated value A is smallest is judged highest reliable. It is assumed here that the local motion vector $V_{i+1}$ has been judged most reliable.

Then, as shown in FIG. 10(C), the values of the local motion vector $V_i$, which has been judged most reliable are referred to and the values of the local motion vector $V_i$ which is the subject of vector correction is replaced by those of the local motion vector $V_{i+1}$. The vector correction of the local motion vector $V_i$ is thus completed. If the local motion vector $V_i$ which is the subject of vector correction is judged most reliable, vector correction is not necessary.

In the above-described vector correction method, since an evaluated value A (accuracy of trial position adjustment) is used for the reliability evaluation of a local motion vector, proper evaluation can be made irrespective of whether or not the local motion vector belongs to the majority. Therefore, the vector correction never fails.

Figure 11:
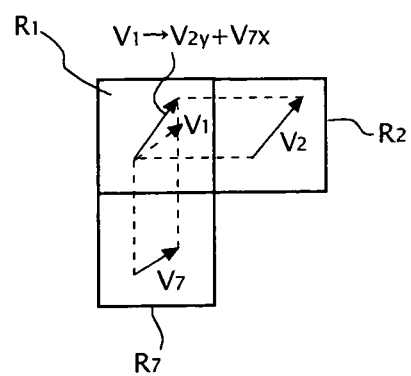
FIG. 11 illustrates a vector correction method in detail (a corner of an image).

Next, a vector correction method for a case that a subject of vector correction is located at a corner of the image (see FIG. 9) will be described in detail with reference to FIG. 11. This vector correction is performed after the other vector corrections have completed. Vector correction on the first local motion vector $V_i$ as a representative one will be described below.

This vector correction is performed without referring to the evaluated value A or B. The Y component of the local motion vector $V_1$ which is the subject of vector correction is replaced by the Y component $V_{2Y}$ of the local motion vector $V_2$ which is adjacent to the local motion vector $V_1$ in the X direction. The X component of the local motion vector $V_1$ is replaced by the X component $V_{7X}$ of the local motion vector $V_7$ which is adjacent to the local motion vector $V_1$ in the Y direction.

(Step S7)

At this step, the blocks $R_1, R_2, \ldots, R_{24}$ of the two images are position-adjusted according to the vector-corrected local motion vectors $V_1, V_2, \ldots, V_{24}$ and then composed. One stabilized image is thus completed. During the image composing, pixels of the image are interpolated where necessary.

Since the position adjustment of the images is performed on a block-by-block basis, all of the vector-corrected local motion vectors $V_1, V_2, \ldots, V_{24}$ are used effectively. This makes it possible to accommodate cases that the motion between the two images includes a rotor component, a zoom component, or the like.

Furthermore, since each of the vector-corrected local motion vectors $V_1, V_2, \ldots, V_{24}$ is consistent with the neighboring local motion vectors, the boundaries between the blocks are almost undiscernible in the stabilized image (end of step S7).

In the image stabilization processing according to the embodiment, vector correction never fails because local motion vectors found are vector-corrected on the basis of evaluated values A (each representing accuracy of trial position adjustment). As a result, the accuracy of position-adjustment on images, that is, the accuracy of image stabilization, is increased.

In the image stabilization processing according to the embodiment, the vector correction based on evaluated values A (steps S4 and S5) is performed repeatedly, which can increase the accuracy of image stabilization further.

That is, in the vector correction method according to the embodiment, since each local motion vector is corrected in a correct direction irrespective of whether it belongs to the majority or minority, the distribution of the local motion vectors in the image converges on their true values.

Incidentally, the vector correction method of Patent Document 2 has a tendency that minority local motion vectors come closer to majority ones. This results in a tendency that as vector correction is performed repeatedly, the distribution of local motion vectors in the image is flattened irrespective of their true values.

(Others)

Figure 12:
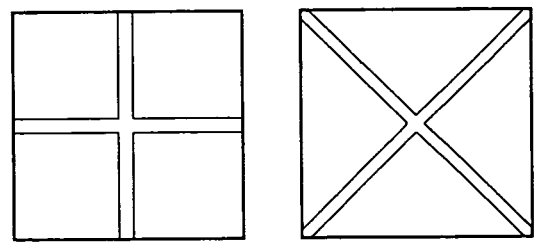
FIG. 12 shows modifications of a subject of position adjustment.

In the image stabilization processing according to the embodiment, three representative lines in each block are subjected to position adjustment in calculating an evaluated value A. However, the number of lines may be changed. Or a partial region having another shape may be used. Such a partial region may have various shapes such as a cross shape and an X-shape (see FIG. 12) and even an L-shape. Furthermore, a low-resolution-converted version of a block may be used instead of its partial region.

In the image stabilization processing according to the embodiment, the number of times of repetition of the vector correction (steps S4 and S5) is set in advance. Alternatively, the image-processing circuit 17 may determine that number by itself. In this case, the image-processing circuit 17 can judge that the repetition should be finished when the number of replaced local motion vectors has become smaller than or equal to a threshold value.

In the image stabilization processing according to the embodiment, the judgment criteria of the vector correction (steps S4 and S5) need not be kept the same and may be changed as appropriate from one loop to another.

In the image stabilization processing according to the embodiment, the vector correction (steps S4 and 5) is performed repeatedly. Alternatively, it need not be performed repeatedly in the case where priority is given to reduction of the amount of calculation over the stabilization accuracy.

In the image stabilization processing according to the embodiment, edge information is extracted (step S2) as a feature quantity of an image when local motion vectors are searched for. Alternatively, a feature quantity other than edge information may be extracted.

In the image stabilization processing according to the embodiment, averaging processing for smoothing the distribution of local motion vectors may be performed before the composing with the position adjustment (step S7). However, the degree of the averaging processing needs to be set to a proper level so as to avoid excessive smoothing of the distribution of local motion vectors.

Although in the embodiment the image stabilization processing is performed by the circuit (image-processing circuit 17) of the electronic still camera, all or part of the image stabilization processing may be performed by another imaging apparatus such as a video camera, any of various image input apparatus, a computer, or the like. All or part of the image stabilization processing can be performed by a computer by preparing a program which enables its execution and installing the program in the computer.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modification and equivalents may be resorted to, falling with the scope thereof.

The invention claimed is:

1. An image-processing device which detects motion between plural input images for each of a plurality of blocks formed by dividing the input images, the device comprising:
    a searching unit searching a local motion vector from edge images of the plural input images for each of the plurality of blocks;
    a calculating unit calculating evaluated values for a plurality of the local motion vector individually found from the plurality of blocks; and
    a correcting unit correcting the plurality of local motion vectors on the basis of the evaluated values of the plurality of local motion vectors, wherein
    the correcting unit performs a relative evaluation between a local motion vector to be corrected and the neighboring local motion vectors using their evaluated values, and corrects a value of the local motion vector to be corrected using a value of a local motion vector that has a highest evaluation among the local motion vector to be corrected and the neighboring local motion vectors,
    one of the evaluated values is an accuracy of position adjustment which is obtained when a search source block is position-adjusted by using the local motion vector, in which the search source block is a block corresponding to a search source of the local motion vector among the plurality of blocks of the input images,
    another of the evaluated values is an edge amount included in the search source block, and
    when performing the relative evaluation, the correcting unit removes a local motion vector with the edge amount smaller than a threshold value from the local motion vector to be corrected and the neighboring local motion vectors, and ranks remaining local motion vectors according to their accuracy of position-adjustment.

2. The image-processing device according to claim 1, wherein:
    the accuracy of position adjustment is obtained when a portion of the search source block of the local motion vector is position-adjusted by using the local motion vector.

3. The image-processing device according to claim 2, further comprising:
    an imaging unit capable of continuously imaging a subject to obtain plural images.

4. The image-processing device according to claim 1, wherein if the search source block of the local motion vector to be corrected is located at a corner of the input images, the correcting unit corrects a horizontal component of the local motion vector to be corrected using a horizontal component of a local motion vector adjacent to the local motion vector to be corrected in a vertical direction to be corrected, and corrects a vertical component of the local motion vector to be corrected using a vertical component of a local motion vector adjacent to the local motion vector to be corrected in a horizontal direction.

5. The image-processing device according to claim 4, further comprising:
    an imaging unit capable of continuously imaging a subject to obtain plural images.

6. The image-processing device according to claim 1, wherein operations of the calculating unit and the correcting unit for all of local motion vectors are performed plural times repeatedly.

7. The image-processing device according to claim 6, further comprising:
    an imaging unit capable of continuously imaging a subject to obtain plural images.

8. The image-processing device according to claim 1, further comprising a composing unit composing the plural input images with position adjustment on the basis of the corrected local motion vector.

9. The image-processing device according to claim 8, further comprising:
    an imaging unit capable of continuously imaging a subject to obtain plural images.

10. The image-processing device according to claim 1, further comprising:

an imaging unit capable of continuously imaging a subject to obtain plural images.

11. A non-transitory computer readable medium that stores a computer-executable image-processing program, the program comprising:

instructions for searching a local motion vector from edge images of the plural input images for each of the plurality of blocks;

instructions for calculating evaluated values for a plurality of the local motion vector individually found from the plurality of blocks; and instructions for correcting the plurality of local motion vectors on the basis of the evaluated values of the plurality of local motion vectors;

instructions for performing a relative evaluation between a local motion vector to be corrected and the neighboring local motion vectors using their evaluated values, and correcting a value of the local motion vector to be corrected using a value of a local motion vector that has a highest evaluation among the local motion vector to be corrected and the neighboring local motion vectors, one of the evaluated values being an accuracy of position adjustment which is obtained when a search source block is position-adjusted by using the local motion vector, in which the search source block is a block corresponding to a search source of the local motion vector among the plurality of blocks of the input images, another of the evaluated values being an edge amount included in the search source block; and instructions for, when performing the relative evaluation, removing a local motion vector with the edge amount smaller than a threshold value from the local motion vector to be corrected and the neighboring local motion vectors, and ranking remaining local motion vectors according to their accuracy of position-adjustment.

12. The non-transitory computer readable medium according to claim 11, the program further comprising:

instructions for continuously imaging a subject to obtain plural images.

* * * * *